United States Patent
Propheter-Hinckley et al.

(10) Patent No.: US 8,757,974 B2
(45) Date of Patent: *Jun. 24, 2014

(54) COOLING CIRCUIT FLOW PATH FOR A TURBINE SECTION AIRFOIL

(75) Inventors: Tracy A. Propheter-Hinckley, Manchester, CT (US); Young H. Chon, Farmington, CT (US); Joseph W. Bridges, Jr., Durham, CT (US)

(73) Assignee: United Technologies Corporation, Hartford, CT (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/622,060

(22) Filed: Jan. 11, 2007

(65) Prior Publication Data

US 2009/0074575 A1    Mar. 19, 2009

(51) Int. Cl.
*F01D 5/18* (2006.01)

(52) U.S. Cl.
USPC ........................................ 416/97 R

(58) Field of Classification Search
USPC ........................................ 415/115; 416/97 R
See application file for complete search history.

(56) References Cited

U.S. PATENT DOCUMENTS

| | | | |
|---|---|---|---|
| 4,474,532 A * | 10/1984 | Pazder | 416/97 R |
| 5,536,143 A | 7/1996 | Jacala | |
| 6,206,638 B1 | 3/2001 | Glynn | |
| 6,254,334 B1 | 7/2001 | LaFleur | |
| 6,287,075 B1 * | 9/2001 | Kercher | 416/97 R |
| 6,290,463 B1 | 9/2001 | Fargher et al. | |
| 6,474,947 B1 * | 11/2002 | Yuri | 416/97 R |
| 6,595,748 B2 * | 7/2003 | Flodman et al. | 416/97 R |
| 6,773,230 B2 | 8/2004 | Bather et al. | |
| 6,890,153 B2 * | 5/2005 | Demers et al. | 416/97 R |
| 6,974,308 B2 * | 12/2005 | Halfmann et al. | 416/97 R |
| 7,097,417 B2 | 8/2006 | Liang | |
| 7,118,326 B2 | 10/2006 | Liang | |
| 7,137,781 B2 * | 11/2006 | Harvey et al. | 416/96 A |
| 7,195,448 B2 * | 3/2007 | Levine et al. | 415/115 |
| 8,083,485 B2 * | 12/2011 | Chon et al. | 416/97 R |

FOREIGN PATENT DOCUMENTS

EP    0971095    1/2000

OTHER PUBLICATIONS

Extended European Search Report, dated Oct. 19, 2009.
European Search Report received Jan. 19, 2012.

* cited by examiner

*Primary Examiner* — Nathaniel Wiehe
*Assistant Examiner* — Ryan Ellis
(74) *Attorney, Agent, or Firm* — Carlson, Gaskey & Olds P.C.

(57) ABSTRACT

A cooled airfoil includes an impingement rib having a multiple of openings which supply a cooling airflow from a cooling circuit flow path toward an airfoil leading edge. The multiple of openings are offset in the impingement rib opposite an outer airfoil wall which includes gill holes. Offsetting the multiple of openings opposite an outer airfoil wall which includes the gill holes focuses the cooling airflow across turbulators to increase the cooling airflow dwell time to increase the thermal transfer therefrom in higher temperature airfoil areas.

12 Claims, 7 Drawing Sheets

COOLING CIRCUIT FLOW PATH FOR A TURBINE SECTION AIRFOIL

This invention was made with government support under Contract No.: N00019-02-C-3003 awarded by the Department of the Air Force. The government therefore has certain rights in this invention.

BACKGROUND OF THE INVENTION

The present invention relates to a gas turbine engine, and more particularly to a combustion section cooling circuit flow path for a component which receives a cooling airflow therethrough as the external surface thereof are exposed to combustion exhaust gases.

A gas turbine engine includes a compressor section that compresses air then channels the compressed air to a combustor section wherein the compressed airflow is mixed with fuel and ignited to generate high temperature combustion gases. The combustion core gases flow downstream through a turbine section which extracts energy therefrom for powering the compressor section and produce additional output power for driving a fan section.

A turbine stage includes a row of turbine rotor blades secured to the outer perimeter of a rotor disk, with a stationary turbine nozzle, having a plurality of stator vanes disposed adjacent thereto. The combustion gases flow between the stator vanes and the turbine blades to extract energy therefrom and rotate the rotor disk. Since the combustion gases are at a high temperature, the turbine vanes and turbine blades are typically cooled with a portion of compressor air bled from the compressor section.

Typical turbine vanes and blades include an airfoil portion over which the combustion gases flow. The airfoil typically includes one or more serpentine cooling passages or other types of cooling circuits therein through which compressor bleed air is channeled to cool the airfoil. The airfoil may also include various turbulators therein to slow the cooling airflow and increase thermal transfer. The cooling airflow is then discharged from the passages through various film cooling holes disposed through the airfoil outer surface.

High pressure turbine vanes and blades typically have relatively high heat loads at the leading edges. To cool the leading edges, impingement cooling is often utilized. Impingement cooling includes direction of the cooling airflow through a row of crossover holes in a wall between a leading edge cavity and an inner passage of the cooling circuit. The cooling air is then discharged through "showerhead" holes in the leading edge to provide film cooling on an exterior surface of the leading edge of the airfoil. "Gill" holes are also often utilized in specific high temperature areas to provide targeted cooling on these particular areas, however, the diversion of significant cooling airflow may decrease the efficiency of the engine. Furthermore, "gill" holes located in some airfoil areas may undesirably decrease the airfoil effectiveness thus further decreasing engine efficiency.

Accordingly, it is desirable to provide a combustion section cooling circuit flow path for a component which receives a cooling airflow therethrough as an external surface thereof is exposed to a high temperature combustion core gas flow while efficiently utilizing the cooling airflow.

SUMMARY OF THE INVENTION

The cooled airfoil according to the present invention includes a forward cavity defined by at least one impingement rib. The impingement rib separates the forward cavity from a leading edge cavity defined at least partially by an outer airfoil wall surface often referred to as a "peanut" cavity. The impingement rib includes a multiple of openings which supply a cooling airflow from a cooling circuit flow path toward the leading edge. The openings operate as nozzles to increase the cooling airflow velocity and expand the cooling airflow to further increase the thermal transfer qualities thereof. The cooling airflow is expelled from the leading edge cavity through leading edge "showerhead" holes as well as, in some locations, "gill" holes.

The multiple of openings are offset in the impingement rib in a direction opposite the outer airfoil wall which includes the "gill" holes. Offsetting the multiple of openings opposite an outer airfoil wall which includes the "gill" holes focuses the cooling airflow across turbulators to increase the cooling airflow dwell time adjacent a higher temperature area of the airfoil wall to increase the thermal transfer therefrom. That is, a lesser quantity of "gill" holes are required yet increased thermal transfer from the higher temperature areas is provided. This more effectively utilizes a minimal cooling airflow volume to reduce the effect on engine efficiency.

In other embodiments, the multiple of turbulators are angled trip strips, vertical trip strips, and or bumps.

The present invention therefore provides a combustion section cooling circuit flow path for a component which receives a cooling airflow therethrough as an external surface thereof is exposed to a high temperature combustion core gas flow while efficiently utilizing the cooling airflow.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
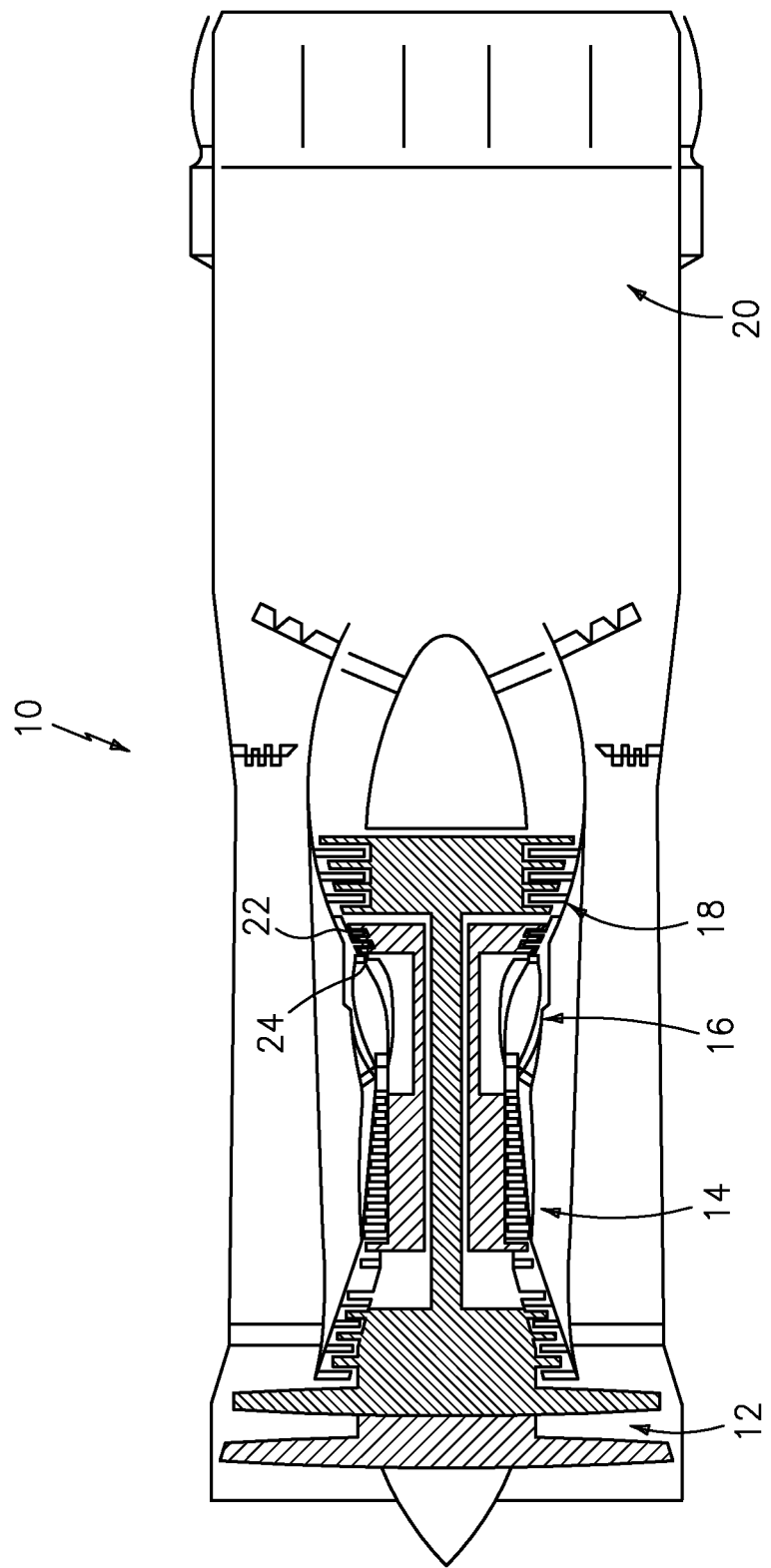
FIG. 1 is a general schematic partial fragmentary view of an exemplary gas turbine engine embodiment for use with the present invention.

FIG. 1 schematically illustrates a gas turbine engine 10 which generally includes a fan section 12, a compressor section 14, a combustor section 16, a turbine section 18, and a nozzle section 20. Within and aft of the combustor 16, engine components are typically cooled due to intense temperatures of the combustion core gases.

Initial turbine rotor stages 22 and turbine stator vane stages 24 within the turbine section 18, for example, are cooled with a cooling airflow typically sourced with a bleed airflow from the compressor section 14 at a pressure higher and temperature lower than the core gas within the turbine section 18. The cooling airflow passes through at least one cooling circuit flow paths 26 (FIG. 2) to transfer thermal energy from the component to the cooling airflow. Each cooling circuit flow path 26 may be disposed in any component that requires cooling, and in most cases the component receive cooling airflow therethrough as the external surface thereof is exposed to core gas flow. In the illustrated embodiment and for purposes of giving a detailed example, the cooling circuit flow path 26 will be described herein as being disposed within a portion of an airfoil such as that of a stator vane 32 (FIG. 2) or a rotor blade. It should be understood, however, that the cooling circuit flow path 26 is not limited to these applications and may be utilized within other areas such as liners, blade seals, and the like exposed to high temperature core gas flow.

Figure 2:
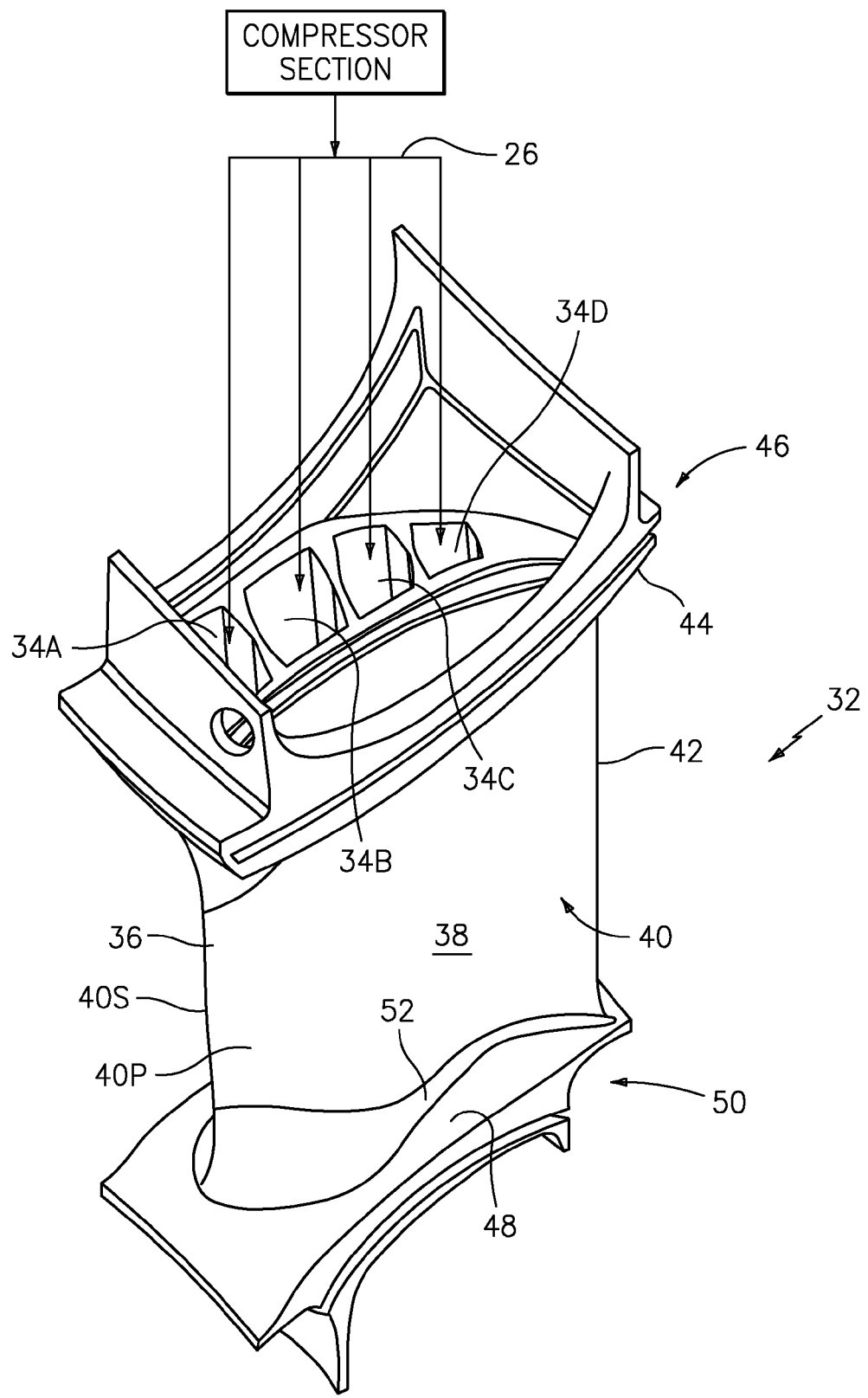
FIG. 2 is a perspective view of a turbine vane.

Referring to FIG. 2, the cooling circuit flow path 26 communicates with a multiple of cavities 34A-34D formed within the stator vane 32. The multiple of cavities 34A-34D direct cooling airflow which may include air received from a compressor section (FIG. 1), from the cooling circuit flow path 26 to high temperature areas of the airfoil such as an airfoil leading edge 36.

The cavities 34A-34D are located within an airfoil portion 38 of the stator vane 32. The airfoil portion 38 is defined by an outer airfoil wall surface 40 between the leading edge 36 and a trailing edge 42. The outer airfoil wall surface 40 is typically shaped for use, for example only, in a first stage, or other stage, of a gas turbine engine. The outer airfoil wall 40 typically has a generally concave shaped portion forming a pressure side 40P and a generally convex shaped portion forming a suction side 40S.

The outer airfoil wall surface 38 is defined between a first end wall 44 at a first end portion 46 and a second end wall 48 at a second end portion 50. The end portions 46, 50 may include features to mount the airfoil to other engine structures. Fillets 52 typically provide a transition between the airfoil portion 36 and the first and second end walls 46, 48. It should be understood that various component arrangement may likewise be utilized with the present invention.

Figure 3:
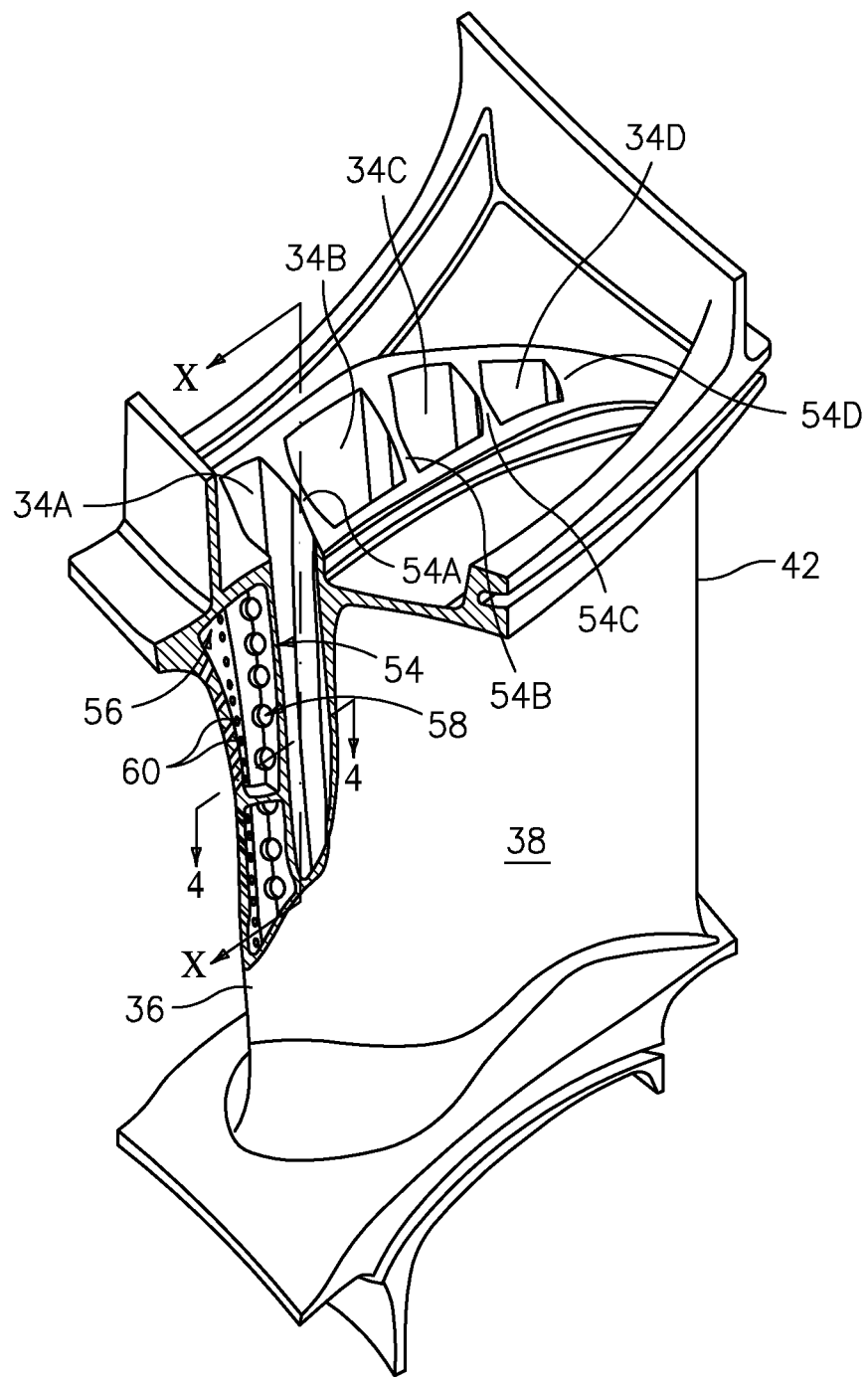
FIG. 3 is a perspective partial fragmentary view of the turbine vane.

Referring to FIG. 3, the cavities 34A-34D include a forward cavity 34A. The forward cavity 34A is generally defined by at least one impingement rib 54 just aft of the leading edge 36. The impingement rib 54 separates the forward cavity 34A from a leading edge cavity 56 defined at least partially by the outer airfoil wall surface 40 (FIG. 4) often referred to as a "peanut" cavity.

Figure 4:
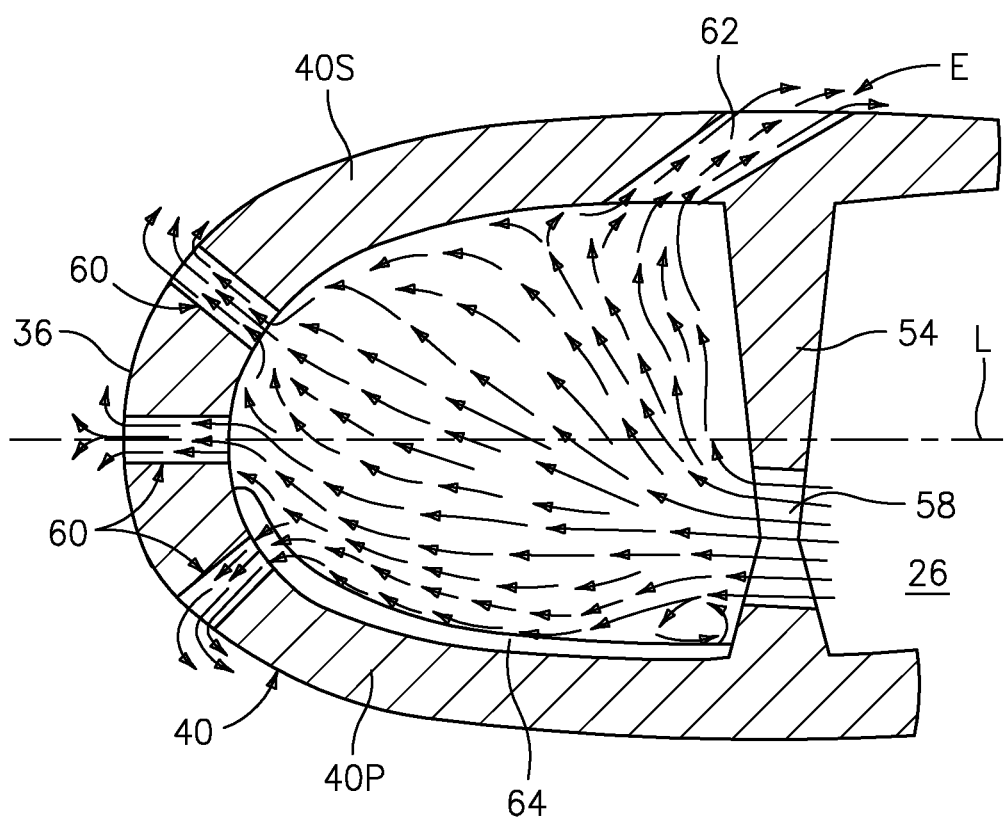
FIG. 4 is a sectional view of the of the turbine vane taken along line 4-4 in FIG. 3.

The impingement rib 54 includes a multiple of openings 58 which supply the cooling airflow from the cooling circuit flow path 26 toward the leading edge 36. The openings 58 operate as nozzles to increase the cooling airflow velocity and expand the cooling airflow further increasing the thermal transfer qualities thereof. The cooling airflow is expelled from the leading edge cavity 56 through leading edge "showerhead" holes 60 as well as in some locations gill holes 62 (FIG. 4). The cavity 56 may have various holes and configurations through the wall 40 which pass significant cooling airflow through the airfoil 26 to cool the surface of the airfoil 38 and other components.

Referring to FIG. 4, a longitudinal axis L is defined transverse to the impingement rib 54 and through the leading edge 36. The longitudinal axis L is preferably defined through an apex of the leading edge 36 and perpendicular to the impingement rib 54. That is, the longitudinal axis L generally bifurcates the leading edge cavity 56 but may not do so with cavities aft of the leading edge cavity 56 due to the shape of the airfoil portion 38. The multiple of openings 58 are preferably offset in the impingement rib 54 and off the longitudinal axis L. The multiple of openings 58 are most preferably located opposite the outer airfoil wall 40 which includes the "gill" holes 62. That is, the "gill" holes 62 are typically located through the suction side 40S such that the openings 58 are offset toward the pressure side 40P which also defines a multiple of turbulators 64 such as trip strips, bumps or such like on an inner wall of the pressure side 40P. It should be understood that the reverse as well as other relationships will likewise be usable.

Offsetting the multiple of openings 58 opposite the outer airfoil wall 40 which includes the "gill" holes 62 focuses the cooling airflow across the adjacent turbulators 64 to increase the cooling airflow dwell time adjacent the higher temperature area (illustrated schematically at H) of the airfoil wall 40 to increase the thermal transfer thereto. That is, a lesser quantity of "gill" holes are required yet still provides effective thermal transfer from the higher temperature areas H. This more effectively utilizes a minimal cooling airflow volume to minimize the effect on engine efficiency.

Figure 5A:
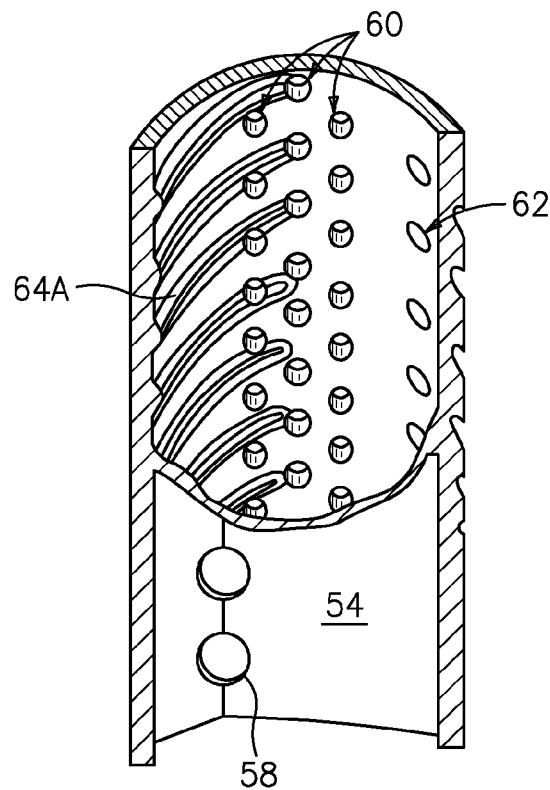
FIG. 5A is an internal, forward looking longitudinal sectional view of the turbine vane taken along line X-X in FIG. 2.
Figure 5B:
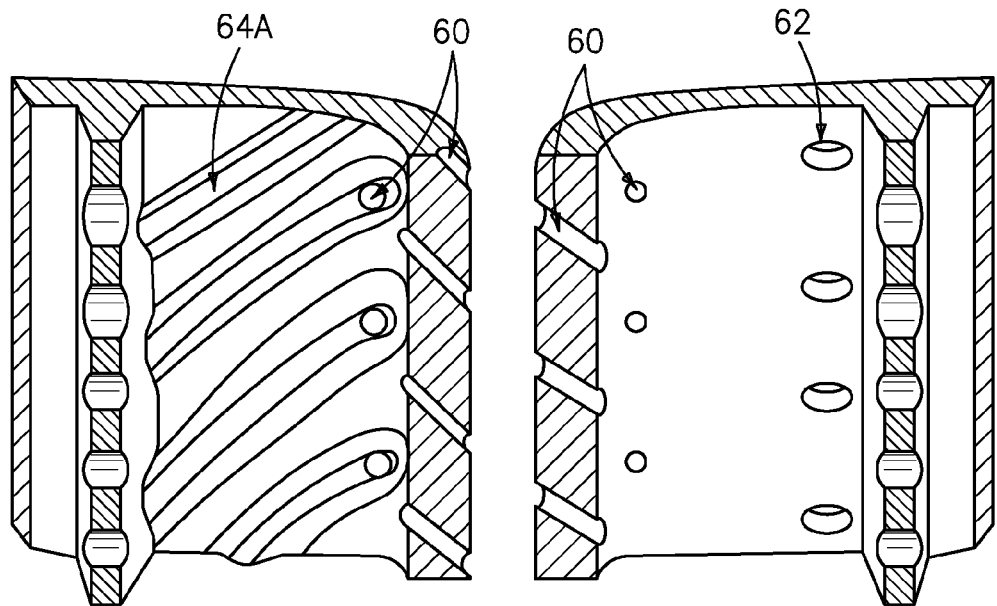
FIG. 5B is a laid open view of the turbine vane of FIG. 5A.

Referring to FIGS. 5A and 5B, another embodiment defines the multiple of turbulators 64 as angled trip strips 64A defined along the suction side 40S which communicate with at least some of the multiple of "showerhead" holes 60. That is, the trip strips 64A generally angled in an upward direction as the trip strips 64A traverse the suction side 40S toward the leading edge 36. It should be understood that other orientations will likewise be usable.

Figure 6A:
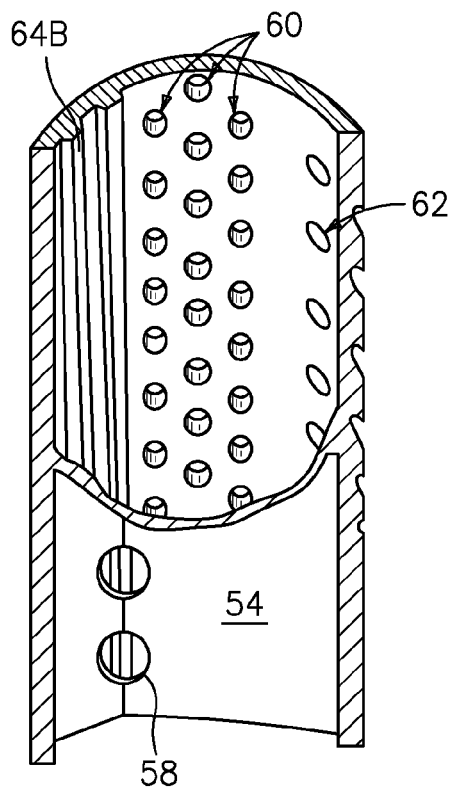
FIG. 6A is an internal, forward looking longitudinal sectional view of another turbine vane taken along line X-X in FIG. 2.
Figure 6B:
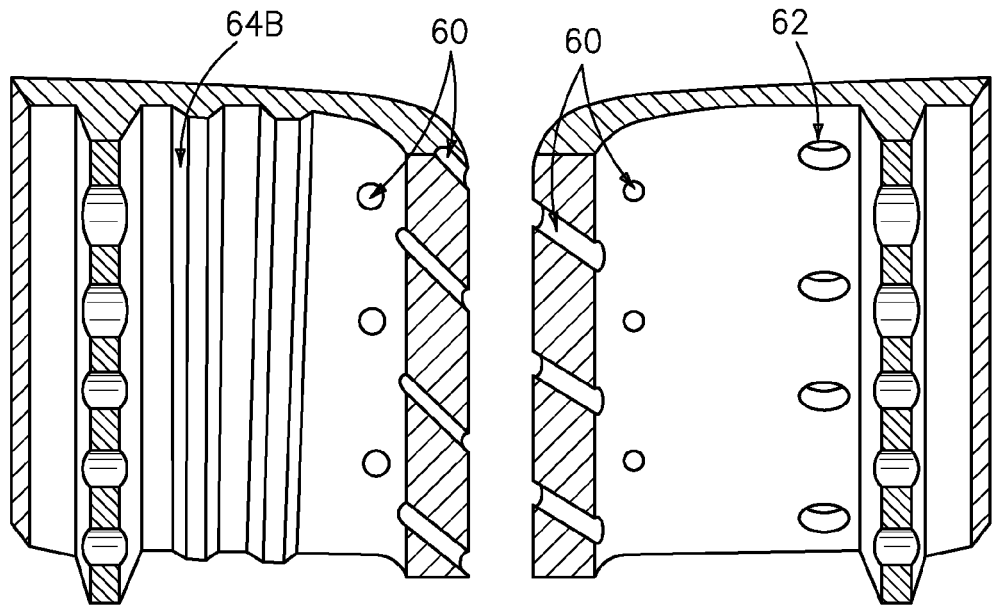
FIG. 6B is a laid open view of the turbine vane of FIG. 6A.

Referring to FIGS. 6A and 6B, another embodiment defines the multiple of turbulators 64 as vertical trip strips 64B defined along the suction side 40S. That is, the trip strips 64B generally directed between the first and second end walls 46, 48.

Figure 7A:
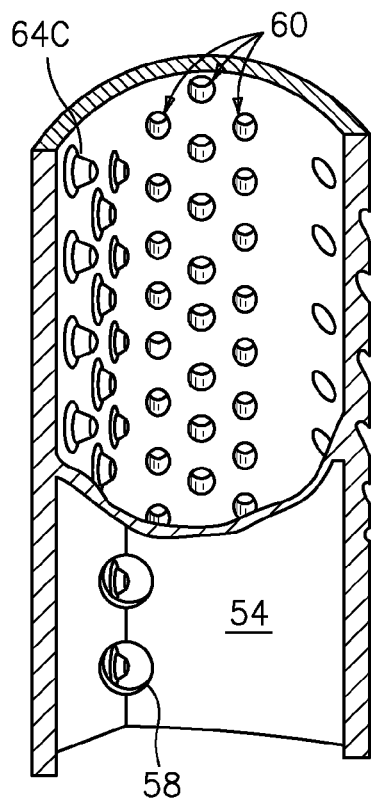
FIG. 7A is an internal, forward looking longitudinal sectional view of another turbine vane taken along line X-X in FIG. 2.
Figure 7B:
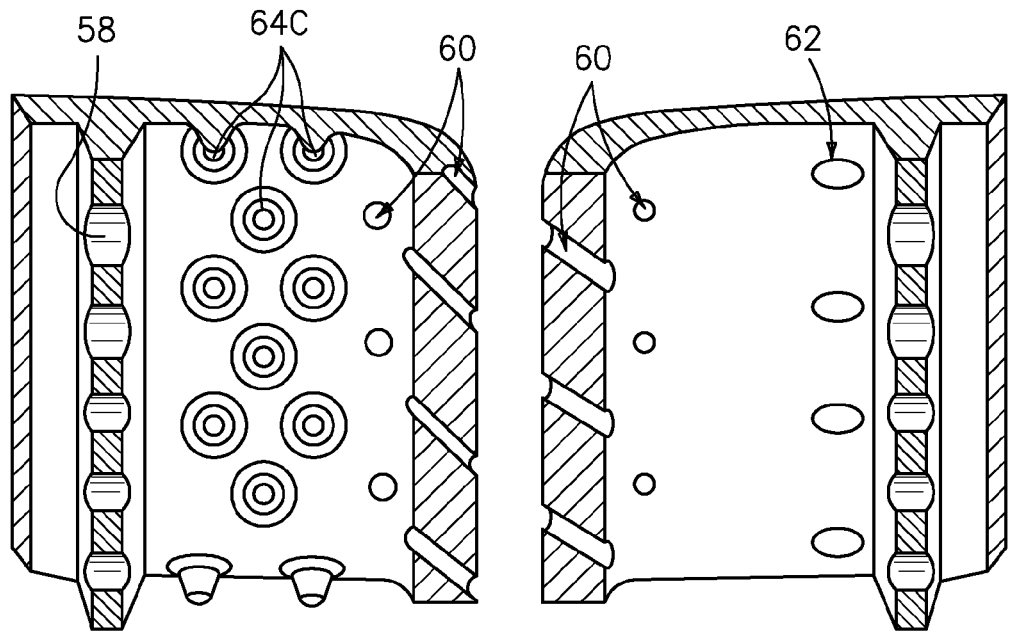
FIG. 7B is a laid open view of the turbine vane of FIG. 6A.

Referring to FIGS. 7A and 7B, another embodiment defines the multiple of turbulators 64 as bumps 64C defined along the suction side 40S.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cooled airfoil within a gas turbine engine comprising:
   an airfoil which defines a forward cavity and a leading edge cavity between a pressure side wall and a suction side wall;

a rib between said pressure side wall and said suction side wall to separate said forward cavity and said leading edge cavity, said forward cavity in communication with a cooling circuit flow path;

an opening through said rib, said opening offset within said forward cavity and said leading edge cavity relative a longitudinal axis of said airfoil toward said pressure side wall;

a multiple of turbulators within said leading edge cavity on said pressure side wall; and a multiple of showerhead holes through a leading edge of said leading edge cavity, wherein said multiple of turbulators include angled trip strips, and wherein one of said multiple of showerhead holes extends through one of said angled trip strips.

2. The airfoil as recited in claim 1, wherein said multiple of turbulators are opposite a multiple of gill holes located through said suction side wall within said leading edge cavity.

3. The airfoil as recited in claim 1, wherein said airfoil is rotationally stationary.

4. The airfoil as recited in claim 3, wherein said rotationally stationary airfoil is a turbine vane.

5. The airfoil as recited in claim 1, further comprising a multiple of gill holes through a suction side wall within said leading edge cavity.

6. The airfoil as recited in claim 1, wherein a portion of said one of said angled trip strips defines a portion of an outer periphery of said one of said multiple of showerhead holes.

7. The airfoil as recited in claim 1, wherein said multiple of angled trip strips extend within said leading edge cavity on said pressure side wall without extending to said suction side wall.

8. The airfoil as recited in claim 1, wherein a longitudinal axis bifurcates said leading edge cavity, said angled trip strips being non-parallel to said longitudinal axis.

9. A turbine vane within a gas turbine engine comprising:

an airfoil which defines a forward cavity and a leading edge cavity between a pressure side wall and a suction side wall;

a rib between said pressure side wall and said suction side wall to separate said forward cavity and said leading edge cavity, said forward cavity in communication with a cooling circuit flow path;

a multiple of gill holes through said suction side wall within said leading edge cavity;

an opening through said rib, said opening offset within said forward cavity and said leading edge cavity toward said pressure side wall opposite said multiple of gill holes; and a multiple of turbulators on said pressure side wall opposite said multiple of gill holes;

a multiple of showerhead holes through a leading edge of said leading edge cavity, wherein said multiple of turbulators include angled trip strips, and wherein one of said multiple of showerhead holes extends through one of said angled trip strips.

10. The turbine vane as recited in claim 9, wherein said airfoil is rotationally stationary.

11. The turbine vane as recited in claim 10, wherein said rotationally stationary airfoil is a turbine vane.

12. The turbine vane as recited in claim 9, wherein a portion of said one of said angled trip strips defines a portion of an outer periphery of said one of said multiple of showerhead holes.

\* \* \* \* \*